United States Patent Office 2,912,333
Patented Nov. 10, 1959

2,912,333

PRODUCTION OF STABLE MALT BEVERAGES

Irwin M. Stone, Eastchester, Philip P. Gray, New York, and Herbert Morawetz, New Rochelle, N.Y., assignors to Baxter Laboratories, Inc., New York, N.Y., a corporation of New York No Drawing. Application March 11, 1958
Serial No. 720,529

13 Claims. (Cl. 99—48)

This invention relates to an improved process for stabilizing and chillproofing malt beverages.

Malt beverages such as beers and ales are now widely distributed in packaged form such as in glass bottles and tin cans. In the distribution of these packaged beverages the container and contents may be subjected to a wide variety of storage conditions for varying periods of time. In addition, variable amounts of air may enter the container during filling operations. Air has a deleterious effect on the stability of the beverage, reducing the normal shelf-life and producing hazes and turbidities.

The present-day consumer demands a beverage that is sparklingly brilliant in appearance with unchanged flavor. Also, beer must remain clear when subjected to prolonged chilling conditions before it is consumed. This necessitates the production of a beverage able to withstand the adverse conditions of oxidation, agitation, vibration, high and low temperature variations, and prolonged storage.

During processing the brewer has control over the processing of the beverage but once the packaged product leaves the brewery it is subjected to the uncontrolled deleterious vagaries of distribution, including the adverse effects of oxidation, time, temperature, and transportation.

To prevent these undesirable effects on the colloidal stability of the beverage, it is common practice in the brewing industry at the present time to include a step termed "chillproofing." The accepted practice in the industry is to treat the beverage after fermentation with certain proteolytic enzymes, the so-called chillproofing enzymes. At the temperature of pasteurization, the enzyme action is accelerated and the high molecular weight and relatively insoluble proteinaceous compounds are broken down into smaller, more soluble scission products which no longer precipitate to form hazes when the beverage is chilled. A portion of this enzyme activity survives pasteurization treatment and it is desirable for prolonged shelf life that this surviving enzyme maintains its activity in the finished pasteurized product.

Deleterious factors which adversely effect the shelf life of the beverage, such as oxidation and traces of metals, may do so not only because of well known reactions with beer constituents to produce unstable compounds causing hazes and sediments, but they may also inactivate the enzymes surviving in the finished packaged product. The inactivating action of the oxygen and metals on the enzymes may not be direct but through the intermediate action on certain oxidizable compounds present in the beer. These compounds may form complexes or chelates with the trace metals which readily become highly oxidized and these oxygen donors then react with and inactivate the enzymes. In mechanisms of this type, in which a trace metal is complexed or chelated by naturally occurring organic materials, the complex or chelate then actively catalyzes oxidation or other types of reactions. Such reactions are common in biological systems. During the course of the oxidation, such complexes also may become insoluble, and contribute to the formation of hazes and turbidities.

Beer also is at times subject to the development of the phenomenon referred to in the industry as "wildness" or "gushing." This behavior, in which the sudden, almost explosive release of $CO_2$ gas when the bottle is opened results in loss of considerable beer, is attributable to formation of "nuclei," believed to trigger the mechanism. These "nuclei," in turn, are apparently formed when certain trace metals are present and may be caused also by holding the container for prolonged periods at low temperatures, and by the further effects of oxidation, agitation, etc. The nature of the substances which may be normally present in beer as precursors for such "nuclei" is not known.

This invention is particularly concerned with the removal of the traces of materials in the beer which may result in instability in all these respects.

For a clearer understanding of the invention, a brief review of the brewing process may be helpful.

The brewing process first involves the treatment of an aqueous suspension of ground malt and other starchy materials under definite time and temperature conditions to partially convert, enzymatically, the aqueous starch suspension into a solution of fermentable sugars. This solution is filtered off from the malt husks and any other insoluble material of the malt and is known as "wort." This sugary wort is boiled with hops and is then cooled. The cooled liquor is treated with yeast and subjected to a slow, low temperature fermentation. The fermented liquor is decanted from the settled yeast and is stored at cold temperatures. The enzymatic chillproofing treatment may be applied at this or a later stage. During this and further processing, the beer (the term "beer" as used herein also denotes ales) is subjected to one or more filtrations to produce a sparklingly brilliant liquid. This highly clarified, perfectly clear beer is then packaged and the package is usually subjected to pasteurization before distribution to the consumer.

From the time the packaged product leaves the brewery until it is consumed it must remain stable and unchanged both in appearance and in taste. Beverages which are not perfectly brilliant and clear or which contain even slight traces of haze or sediments are unacceptable to the consumer. The object of this invention is the prevention of any of the undesirable changes from occurring during the distribution and shelf life of the packaged product.

We have found that certain polyelectrolytes, when added to beer as a solution, form turbidities and precipitates. When these precipitates are filtered off, the resulting beer is not only chillproof but has a high degree of stability, and especially prolonged shelf life and is resistant to the development of wildness or gushing. Such beers also show remarkable resistance to the deleterious effects of air and storage at high temperatures.

The terms "stability," "stabilized," or "stabilizing" as used herein have a broad connotation, not only referring to the prevention of hazes and turbidity during the shelf-life of the beverage but also to the inhibition or prevention of the development of wildness or gushing in the finished packaged beverage.

The polyelectrolytes are particularly effective when used in conjunction with the customary enzymatic chillproofing process, presumably due to the fact that the surviving enzyme activity is thereby especially well stabilized and protected. The treatment not only permits the use of reduced amounts of enzyme but produces a beverage which is uniquely resistant to the adverse effects of air and high temperature storage on shelf life stability, and improved resistance to the development of wildness to a degree that is not obtainable by the use of the enzymatic chillproofing process alone.

The polyelectrolytes which we have found suitable for use in this process are homopolymers of vinylpyridines and their homologs and copolymers thereof with various unsaturated compounds. These polymers and copolymers are relatively insoluble in water in the pH range of approximately 4.0 to 7.0. They are, however, soluble in dilute acids or alkalis that either reduce the pH below 4 or raise it above 7. When the solutions of the polyelectrolytes are added to beer that has a pH in the neighborhood of about 4.3, for example, they are again rendered insoluble and precipitate out forming a fine haze which coagulates on further cold storage to form larger flocs. This flocculant precipitate is readily filterable.

Specific polymeric materials which we have found useful for the purpose of this invention are homopolymers of 2-vinylpyridine and copolymers of 2-vinylpyridine with methacrylic acid, copolymers of 5-vinyl-2-methylpyridine with methacrylic acid, copolymers of 2-vinylpyridine with crotonic acid, copolymers of 2-vinylpyridine with vinylacetic acid, and copolymers of 2-vinyl-5-ethylpyridine with methacrylic acid. The homopolymers and copolymers of 4-vinylpyridine may also be employed but they appear to be not as satisfactory as those mentioned above because the turbidity which is formed on addition to beer does not readily flocculate and hence difficulty is experienced in filtration.

Other copolymers useful for the purposes of this invention may be prepared by the joint polymerization of vinylpyridines with various other unsaturated materials, such as acrylic acid, allylacetic acid, dimethylacrylic acid, in addition to the unsaturated acids mentioned above. Further homopolymers and copolymers useful in the invention may be prepared from other substituted vinylpyridines such as the vinylpicolines, vinyllutidines and vinylcollidines in addition to the substituted vinylpyridines specifically mentioned above.

The methods for the preparation of these homopolymers and copolymers are known to those skilled in the art. They are readily prepared, for instance, by bulk polymerization, by the addition of small amounts of a catalyst such as azo-bis-isobutyronitrile and heating, or by polymerization in a solvent such as methylethylketone with the addition of a catalyst and heating to 60 to 70° C. for a few hours. The polymers may be separated and purified from the reaction mixtures by the usual commonly employed methods.

Amounts of these materials of the order of 1 to 2 pounds per 100 barrels of beer are sufficient to produce a highly stabilized beer. When used in conjunction with the enzymatic chillproofing process, reduced amounts of the chillproofing enzymes than are customarily employed may be used and lower levels, for example, 0.5 to 1 pound of the polymers, may be employed. For beers that do not require a high degree of stabilization, smaller amounts of the polymers or copolymers may be employed, such as 0.25 pound per 100 barrels. Amounts in excess of 2 pounds, such as 4 or 6 pounds, may be employed for producing beers which will stand up under the most extraordinarily severe conditions of storage, but these higher amounts are generally not required. Amounts in excess of 6 pounds per 100 barrels may be used if desired, as there is no apparent effect on the normal properties of the beer from the use of excessively large amounts. The upper limit of treatment is dictated purely by the economics involved in the cost of the treatment.

The preferred method of addition of the polymers and copolymers to the beers is as follows. Concentrated aqueous solutions of the polymers or copolymers are prepared by treatment with slightly more than the stoichiometric amounts either of an alkali such as sodium carbonate or of dilute acids as determined by titration. These solutions are added to the beer at some stage after fermentation. Because the beer is highly buffered, no measurable change in the pH of the beer results from these additions. The point of addition of these polymers in commercial practice is dictated by the individual processing conditions, available equipment, and production requirements of the particular plant. The solution of the polymers is added to the malt beverage at any point after fermentation and before the final filtration. Usually it is convenient to add it to the beer as it leaves the fermenters and enters the storage tanks. Depending on available equipment, the solution may be proportioned into the beer lines as the beer is being moved from one tank to another or the solution can be thrown into the empty tank through the manhole which is then sealed shut and the beer filled into the tank. The motion of the incoming beer produces thorough mixing and distribution. The beer is held in cold storage until the precipitated polymers flocculate and the beer is then filtered and any further processing, such as storage, carbonation, filtration, and packaging, is conducted in the manner usually employed.

If this treatment is used in combination with enzymatic chillproofing, it is usually preferable to filter off the precipitated polyelectrolyte before addition of the chillproofing enzyme, in order to avoid the possibility of removing some of the enzymatic activity during this filtration. However, this sequence of addition has not been found to be absolutely essential, as beers with satisfactory shelf-life are obtained when the chillproofing enzymes are added without first filtering off the precipitated polymers.

The following examples are illustrative of the principles of the invention:

*Example 1*

A 1% aqueous solution of 2-vinylpyridine polymer is made by stirring 5 grams of the polymer into a mixture of 400 ml. of 0.1 N HCl and 100 ml. of water, or a multiple of these proportions depending on the volume of beer to be treated. The suspension is stirred and allowed to stand until the polymer dissolves. The solution is then added to beer passing from the fermenters to storage tanks by means of a proportioning pump in the proportion of 90 liters of solution, equivalent to 2 pounds of polymer, to each 100 barrels of beer. The beer is held in cold storage until the precipitated material flocculates and is then prefiltered. The prefiltered beer is transferred to a storage tank and held cold until ready for the final filtration. After final filtration the brilliant beer is packaged and pasteurized in the customary manner.

*Example 2*

A 1% solution of a copolymer of 75 parts by weight of 2-vinylpyridine and 25 parts by weight of methacrylic acid is prepared by stirring 5 grams of the copolymer into 500 ml. of water to which 100 ml. of a 5% aqueous solution of $Na_2CO_3$ has been added, or a multiple of these proportions depending on the volume of beer to be treated. The copolymer may also be dissolved in dilute acid as in Example 1. The solution is added to fermented beer as in Example 1 in the proportion of 45 liters of the solution, equivalent to one pound of the copolymer, to each 100 barrels of beer. This beer is stored to allow the precipitated copolymer to coagulate and is then prefiltered to remove the precipitated material. The prefiltered beer is transferred to another storage tank and a commercial chill-proofing agent (Collupulin) is added to the extent of 1 lb. per 100 barrels in the customary manner. The beer is then finished off, packaged and pasteurized as usual. The beer thus treated is exceedingly stable and has a long shelf life much beyond that normally encountered with enzymatically chillproofed beverages.

*Example 3*

Beer from the fermenter is transferred to a storage tank and enzymatically chillproofed in the customary manner by the addition of an enzymatic chillproofing preparation (Collupulin). This chillproofing agent is added at appreciably less than the usual level, 1 lb. per 150 bbls. of beer. The beer is allowed to stand for a few hours to several days and then a solution of poly-2-vinylpyridine is added. Sufficient solution is added so that 1 lb. of the polymer is added per 100 bbls. of beer. This solution is prepared to contain 2% by weight of the polymer and for each gram of polymer in this aqueous solution there is added approximately 7 ml. of 1 N hydrochloric acid to effect solution of the polymer. After addition of this solution, the beer is allowed to stand and the precipitated polymer permitted to coagulate and settle. The beer is then given the usual prefiltration and transferred to a storage tank until required for finishing, which is done in the customary manner without further change. The beverage resulting from this procedure is unchanged and normal in appearance or taste characteristics but is remarkably stable and resistant to the deleterious influences of air and oxidation.

Example 4

A copolymer prepared by polymerizing a mixture of 75% 5-vinyl-2-methylpyridine and 25% methacrylic acid is dissolved in water containing approximately 8 ml. of 1 N hydrochloric acid for each gram of copolymer therein. A 2% or stronger solution of the copolymer may be employed. This solution is added to beer, preferably by means of a proportioning device, at the rate of 2 lbs. of copolymer for every 100 bbls. of beer. It may be conveniently added when the beer is being transferred from the fermenters to the storage tanks. When mixed with the beer, the polymer precipitates and it is allowed to stand until the precipitate flocculates. The beer is then given the customary prefiltration treatment and is transferred to a storage tank. No enzymatic chillproofing compound is added. The beer is processed, as usual, being given its carbonation, final filtration, packaging, and pasteurization in the customary manner without further change in the normal brewery procedure. The beer produced by this process is remarkably stable and unaffected by the influences which tend to reduce the shelf life of ordinarily prepared beer.

Example 5

To beer coming from the fermenter and being transferred to a storage tank, there is injected into the line by means of a proportioning device a 2% solution of a copolymer of 2-vinylpyridine and methacrylic acid (50–50). The 2% solution is easily prepared by dissolving the required amount of copolymer in water containing 8 ml. of 1 N HCl for each gram of copolymer. The copolymer solution is added to give a level of 2 lbs. of copolymer per 100 bbls. of beer. The treated beer is allowed to stand until the precipitate coagulates and it is then prefiltered. The prefiltered beer is transferred to a tank and a solution of a commercial enzymatic chillproofing preparation (Collupulin) is added during the transfer by means of a proportioning device. The level of this enzymatic chillproofing treatment required is less than normally used, amounting to only 1 lb. per 200 bbls. The beer is then processed without any further change from the normal brewery schedule, being given the usual carbonation, final filtration, bottling, crowning, pasteurization, and labeling. The resulting beer will be found to have much greater shelf life and stability than beer only enzymatically chillproofed.

Example 6

A 2% solution of a copolymer of 2-vinylpyridine and methacrylic acid (75–25%) is added to fermenter beer being transferred to storage. 4 lbs. of copolymer are added per 100 bbls. of beer. This solution is readily prepared by dissolving the copolymer in water containing 8 ml. of 1 N hydrochloric acid per gram of copolymer. The beer is allowed to stand to permit the precipitate to coagulate and it is then prefiltered. The further processing and finishing off of the beer is then done by the customary procedure used in the brewery except that no enzymatic chillproofing preparation is added during this finishing off. This beer after packaging will be found to be much more resistant to the effects of air and high temperature storage and its shelf life will be much longer than beer that is subjected to enzymatic chillproofing treatment alone.

This application is a continuation-in-part of our application Serial No. 593,337 filed June 25, 1956.

We claim:

1. The improvement in the production of stabilized malt beverages which comprises adding to the fermented beverage an organic polyelectrolyte substantially insoluble in water in the pH range of approximately 4 to 7 and soluble at a pH above and below said range selected from the group consisting of homopolymers of vinylpyridines and their lower alkyl substitution products and copolymers thereof with another vinyl monomer and thereafter removing the resulting precipitate from the beverage.

2. The improvement in the production of stabilized malt beverages which comprises adding to the fermented beverage an aqueous solution of an organic polyelectrolyte substantially insoluble in water in the pH range of approximately 4 to 7 and soluble at a pH above and below said range selected from the group consisting of homopolymers of vinylpyridines and their lower alkyl substitution products and copolymers thereof with another vinyl monomer and thereafter removing the resulting precipitate from the beverage.

3. The improvement in the production of stabilized malt beverages which comprises adding to the fermented beverage a polymer selected from the group consisting of homopolymers of vinylpyridines and their lower alkyl substitution products and copolymers thereof with unsaturated carboxylic acids and thereafter removing the resulting precipitate from the beverage.

4. The improvement in the production of stabilized malt beverages which comprises adding to the fermented beverage an aqueous solution of a polymer selected from the group consisting of homopolymers of vinylpyridines and their lower alkyl substitution products and copolymers thereof with unsaturated carboxylic acids and thereafter removing the resulting precipitate from the beverage.

5. The improvement in the production of stabilized malt beverages which comprises adding to the fermented beverage an aqueous solution of a polymer selected from the group consisting of homopolymers of vinylpyridines and their lower alkyl substitution products and thereafter removing the resulting precipitate from the beverage.

6. The improvement in the production of stabilized malt beverages which comprises adding to the fermented beverage an aqueous solution of a polymer selected from the group consisting of copolymers of vinylpyridines and their lower alkyl substitution products with unsaturated carboxylic acids and thereafter removing the resulting precipitate from the beverage.

7. The improvement in the production of stabilized malt beverages which comprises adding to the fermented beverage a polymer selected from the group consisting of homopolymers of vinylpyridines and their lower alkyl substitution products and copolymers thereof with unsaturated carboxylic acids in the proportion of from 0.25 to 6 pounds of the polymer to each 100 barrels of the malt beverage and thereafter removing the resulting precipitate from the beverage.

8. The improvement in the production of stabilized malt beverages which comprises adding to the fermented beverage a polymer of 2-vinylpyridine and thereafter removing the resulting precipitate from the beverage.

9. The improvement in the production of stabilized malt beverages which comprises adding to the fermented beverage a copolymer of 2-vinylpyridine and methacrylic acid and thereafter removing the resulting precipitate from the beverage.

10. The improvement in the production of stabilized malt beverages which comprises adding to the fermented beverage a proteolytic enzyme, a polymer selected from the group consisting of homopolymers of vinylpyridines and their lower alkyl substitution products and copolymers thereof with unsaturated carboxylic acids and thereafter removing the resulting precipitate from the beverage.

11. The improvement in the production of stabilized malt beverages which comprises adding to the fermented beverage a polymer selected from the group consisting of homopolymers of vinylpyridines and their lower alkyl substitution products and copolymers thereof with unsaturated carboxylic acids, thereafter removing the resulting precipitate from the beverage and adding thereto a proteolytic enzyme.

12. The improvement in the production of stabilized malt beverages which comprises adding to the fermented beverage an aqueous solution of a polymer selected from the group consisting of copolymers of vinylpyridines and their lower alkyl substitution products with another vinyl monomer and thereafter removing the resulting precipitate from the beverage.

13. The improvement in the production of stabilized malt beverages which comprises adding to the fermented beverage a polymer selected from the group consisting of homopolymers of vinylpyridines and their lower alkyl substitution products and copolymers thereof with another vinyl monomer, thereafter removing the resulting precipitate from the beverage and adding thereto a proteolytic enzyme.

References Cited in the file of this patent

UNITED STATES PATENTS 2,847,403     Contois _____ Aug. 12, 1958